United States Patent [19]

Pontiff

[11] Patent Number: 5,246,976
[45] Date of Patent: Sep. 21, 1993

[54] APPARATUS FOR PRODUCING FOAMED, MOLDED THERMOPLASTIC ARTICLES AND ARTICLES PRODUCED THEREBY

[75] Inventor: Thomas M. Pontiff, Gansevoort, N.Y.

[73] Assignee: Astro-Valcour, Inc., Glens Falls, N.Y.

[21] Appl. No.: 19,825

[22] Filed: Feb. 19, 1993

Related U.S. Application Data

[62] Division of Ser. No. 689,533, Apr. 23, 1991, Pat. No. 5,202,069.

[51] Int. Cl.$^5$ ............................................. C08J 9/00
[52] U.S. Cl. ..................................... 521/143; 521/79; 521/146; 521/155; 521/180; 521/182
[58] Field of Search ............... 521/143, 182, 146, 155, 521/180, 79

[56] References Cited

U.S. PATENT DOCUMENTS

| | | | |
|---|---|---|---|
| 3,468,990 | 9/1969 | Odell | 264/55 |
| 3,763,109 | 10/1973 | Witsiepe | 260/75 R |
| 3,766,146 | 10/1973 | Witsiepe | 260/75 R |
| 4,128,950 | 12/1978 | Bowerman et al. | 36/30 R |
| 4,130,947 | 12/1978 | Denu | 36/30 R |
| 4,208,368 | 6/1980 | Egli | 264/40.3 |
| 4,280,005 | 7/1981 | Fox | 521/90 |
| 4,315,882 | 2/1982 | Hiratsuka et al. | 264/349 |
| 4,323,528 | 4/1982 | Collins | 264/53 |
| 4,351,911 | 9/1982 | Fox | 521/138 |
| 4,354,318 | 10/1982 | Frederick et al. | 36/30 R |
| 4,355,155 | 10/1982 | Nelsen | 528/301 |
| 4,399,620 | 8/1983 | Funck | 36/30 R |
| 4,481,727 | 11/1984 | Stubblefield | 36/83 |
| 4,556,705 | 12/1985 | McCready | 528/289 |
| 4,582,656 | 4/1986 | Hoffman | 264/22 |
| 4,588,754 | 5/1986 | Liu | 521/92 |
| 4,627,178 | 12/1986 | Sullivan et al. | 36/44 |
| 4,694,591 | 9/1987 | Banich et al. | 36/102 |
| 4,806,293 | 2/1989 | Akiyama et al. | 264/53 |
| 4,870,111 | 9/1989 | Pontiff et al. | 521/60 |
| 4,887,367 | 12/1989 | Mackness et al. | 36/28 |
| 4,894,191 | 1/1990 | Tatzel et al. | 264/53 |
| 4,900,490 | 2/1990 | Kozma | 264/54 |
| 4,938,912 | 7/1990 | Pelzer | 264/46.8 |
| 4,984,376 | 1/1991 | Walter et al. | 36/30 R |
| 4,988,740 | 1/1991 | Walter et al. | 521/138 |

FOREIGN PATENT DOCUMENTS 58-067427  4/1983  Japan ..................... 264/55

OTHER PUBLICATIONS

HYTREL® Polyester Elastomer Bulletin IT-HY-T-390.035.
Sheridan, T. W., "Creative Design With Thermoplastic Elastomers", *Plastics Design Forum*, Mar./Apr. 1989, pp. 21 and 24-26.
Lewis, G., "Putting Insoles Through the Paces," *Mechanical Engineering*, Apr. 1989, pp. 96-98.
Rottman, M., "Supracor Markets Cushioning Material for Insoles", *Footwear News*, Nov. 28, 1988.

*Primary Examiner*—Morton Foelak
*Attorney, Agent, or Firm*—Fisher, Christen & Sabol

[57] ABSTRACT

Method and apparatus for producing a molded article of a foamed thermoplastic resin and articles produced thereby. A molten mass of an expandable thermoplastic resin is accumulated in an accumulator while it is prevented from foaming. A quantity of the accumulated foamable melt is extruded through a die orifice having a shape adapted to reflect the shape of the desire finished product. The extruded foamable melt commences foaming as it comes in contact with the atmosphere. As the extruded thermoplastic resin foams, it is pulled vertically downward from the die orifice by gravity. The downward-hanging, foamed, thermoplastic material is captured between the halves of a vertically-oriented mold before the foaming expansion of the foamable melt has been completed. The foamed thermoplastic material is compressed by the vertically-oriented mold into the desired shape. The foamed thermoplastic material may be formed into intricate articulations within the female mold portion by gases emitted from jets in the male mold portion or by venting or drawing off gases disposed in the female mold portion. The mold halves may also be configured to confine any foamed resin flash to the bottom portion of the molded article.

9 Claims, 4 Drawing Sheets

APPARATUS FOR PRODUCING FOAMED, MOLDED THERMOPLASTIC ARTICLES AND ARTICLES PRODUCED THEREBY

This is divisional of application Ser. No. 07/689,533, filed Apr. 23, 1991, now U.S. Pat. No. 5,202,069.

BACKGROUND OF THE INVENTION

1. Field of the Invention

The present invention relates, in general, to foamed, molded, uncrosslinked thermoplastic articles. More specifically, a method and apparatus for producing foamed, molded, thermoplastic shoe midsoles are disclosed.

2. Description of the Prior Art

In the production of foamed articles of thermoplastic resin, three methods are generally known (1) the bead molding method; (2) the injection molding method; and (3) the extrusion method. Under the bead molding method, pre-foamed particles are placed in a mold cavity and heated to encourage further expansion and fuse-bonding of the particles. The bead molding method is disadvantageous because it requires two or more processing steps and traces or marks of the beads are left in the resulting molded article.

Under the injection molding method, a molten mass of a foamable resin is injected into a mold cavity and the injected resin is allowed to expand in the mold. This method requires a high injection pressure, however, and hence, a large and strong molding apparatus capable of withstanding the pressure. Moreover, the injection molding can only provide an expansion ratio (i.e., density reduction from resin to foam) of at most about 2.

In the extrusion method, a molten, expandable resin is extruded through a die. The method may only be used to produce foamed articles of a simple shape such as sheet- or rod-like products, however.

One application where the above-noted problems of the foaming/molding prior art are especially visible is in the production of athletic shoe midsoles (i.e., the material between the shoe upper and the ground-contacting outer sole). Shoe midsoles have been characterized as the most important portion of athletic footwear. The rather significant forces generated by runners as they run, especially in the ball, forefoot and heel regions of the foot, must be largely absorbed by the shoe midsole. Furthermore, the midsole preferentially is also capable of returning a significant portion of the runner's energy through his/her body as the shoe contacts the ground, creating a beneficial sensation of springiness. Athletic shoe midsoles must also be able to withstand the large number of compression and return cycles generated by, for example, long-distance runner, without jeopardizing the weight bearing and cushioning capacity of the shoe midsole.

Specifically, material utilized for an athletic shoe midsole must exhibit the requisite levels of hardness, resiliency and compressive strength. Hardness is commonly measured by, for example, an ASKER C hardness tester (or durometer). The hardness tester calculates the hardness of a test specimen from the measured depth of penetration of an indentor of predetermined geometry into the specimen (once a state of balance is reached between the resistance force of the specimen and the force applied to the indentor). To be suitable for use as an athletic shoe midsole, thermoplastic foamed material must exhibit a hardness of 30 to 70 ASKER C, and preferably exhibits a hardness of about 40 to 55 ASKER C.

The resiliency of a material may be quantified by measuring the material's energy return ratio. In general, the energy return ratio is obtained by dropping an object onto the material and measuring how high the object bounces back (e.g., a perfect spring would have an energy return ratio of 1.00). The methodology of measuring a material's energy return ratio is discussed in detail in U.S. Pat. No. 4,984,376, which is hereby incorporated by reference, at column 10, lines 37 to 64. To be suitable for use as an athletic shoe midsole, a material should exhibit an energy return ratio of at least 0.20 (using the method of measuring energy return ratio disclosed in the ASTM bulletin number D-2632-79). By way of comparison, under this testing procedure, foamed thermosetting polyurethane exhibits a energy return ratio of about 0.25 to 0.30 and foamed HYTREL ® (a polyester elastomer manufactured by E. I. du Pont de Nemours and Co. of Wilmington, Del.) exhibits an energy return ratio of about 0.50 or more.

Compressive strength is measured by gradually compressing a flat sample of material (e.g., a cube with a 10 cm × 10 cm (or 1 inch by 1 inch) top surface) and measuring the pressure needed to compress the sample a given proportion of its original height (e.g., 10%, 25% and 50%). Compressive strength is measured in kilo Pascals (kPa), or pounds per square inch (psi). Preferred materials for athletic shoe midsoles should exhibit a compressive strength of about 48 to 138 kPa (7 to 20 psi) at 10% compression, 117 to 207 kPa (17 to 30 psi) at 25% compression and 248 to 379 kPa (36 to 55 psi) at 50% compression.

Another important criteria which any proposed athletic shoe midsole material must meet is the material's specific gravity. Specific gravity relates to, and in some senses, grows out of the previously discussed properties. To be suitable for use as an athletic shoe midsole, a material must have a specific gravity of about 0.5 gm/cm$^3$ or less. Preferred midsole materials have a specific gravity of about 0.3 gm/cm$^3$ or less. This restriction, in turn, limits the methods which may be used to form the midsole. For example, injection molding may typically only be used with materials having higher specific gravities than those suitable for use as athletic shoe midsoles (e.g., about 0.8 gm/c$^3$). If lower density materials are injection molded, the material will often not foam uniformly, thereby causing broken cells within the foamed product.

In addressing these concerns, the athletic footwear industry has developed a variety of different solutions. For example, many shoe midsoles are currently made of crosslinked EVA (ethylene vinyl acetate). Crosslinked EVA exhibits good durability, but since it is a crosslinked material, EVA generates a large amount of nonrecyclable waste material during processing. Furthermore, production of midsoles from crosslinked EVA normally requires several processing steps (see, e.g., U.S. Pat. No. 4,900,490, which is hereby incorporated by reference). For example, after a plank of EVA is produced, the plank must be skived (i.e., cut along its height to form two or more separate, thinner planks). Thereafter, the plank is cut into plugs having the approximate configuration of the desired midsole. The plugs of EVA are then inserted into molds and compression molded. The plugs are purposely cut slightly oversize relative to the molds to encourage the material to adapt to any configurations present within the mold.

The compression molding step also re-forms a skin over the open cells of material which were exposed when the plank of EVA was skived. This processing methodology is both multi-step and time-consuming (e.g., 5 to 10 minutes per compression cycle—i.e., heating to seal the skived EVA and allowing the re-compressed EVA to cool).

Other currently-available processes also exhibit several problems. For example, in producing shoe midsoles from thermoplastic material (e.g., polyester elastomer), multi-step processing is still the norm. For example, a large piece of thermoplastic material is extruded. Thereafter, the material is skived, die cut into plugs of approximately the desired size and the plugs of material are subjected to secondary compression molding to form designs in the material and to create a cell-enclosing skin over the cut areas of foam.

When uncrosslinked thermoplastic materials are utilized, the large amounts of waste material generated by this type of process may at least be recycled (with crosslinked material, the excess material cannot be reprocessed and must be discarded), but even with uncrosslinked materials, these multiple processing steps still mandate that large amounts of labor be expended in producing each foamed article. Furthermore, since the thermoplastic material is normally fully foamed when it is subjected to the secondary, skin-forming compression molding, it is difficult to produce articles having intricate areas and/or shapes of raised material (e.g., company logos on the sides of athletic shoe midsoles). Conventional foaming methods also have difficulty producing foamed material having substantially uniform density and cell structure throughout the article (e.g., in the expansion process of U.S. Pat. No. 4,806,293, which is hereby incorporated by reference, the expanding material may fold over on itself, thereby forming TMP seams in the finished article).

The present method and apparatus, on the other hand, favorably resolve these problems and suboptimizations inherent in the prior art by providing a one-step process for producing low-density foamed articles from uncrosslinked (and hence recyclable) thermoplastic material whereby uniform density is maintained, foam cell integrity is maintained and even intricate designs in the female mold section may be reproduced in the shoe innersole.

SUMMARY OF THE INVENTION

In general, any known thermoplastic resin which is capable of being foamed to low density (e.g., 0.5 gm/cm$^3$ or less) may be used as a raw material in the process of the present invention. The foamability of suitable resins may alternatively be quantified by noting that the resin should be capable of producing a density reduction of at least 0.5 (i.e., comparing the unfoamed and foamed forms of the resin). Illustrative of suitable thermoplastic resins are olefins such as polyethylenes, polypropylenes and copolymers thereof; styrene resins such as polystyrenes; polycarbonate resins; and thermoplastic polyurethanes and copolyetherester elastomers. The method of the present invention may be used with a wide variety of materials, the choice of a particular thermoplastic resin for a particular application will depend upon the particular article or properties desired to be produced.

The thermoplastic resin exemplified above is homogeneously commingled with a blowing agent at a temperature higher than the melting point of the resin under a pressurized condition to obtain a molten, expandable thermoplastic resin composition. Both decomposition-type blowing agents and solvent-type blowing agents may be used for the purpose of the present invention. Examples of the solvent-type blowing agents include cycloparaffins such as cyclobutane and cyclopentane; aliphatic hydrocarbons such as propane, butanes, pentanes, hexanes and heptanes; and halogenated hydrocarbons such a trichlorofluoromethane, dichlorodifluoromethane, methyl chloride, methylene chloride, dichlorotetrafluoroethane, tetrafluoroethane, tetrafluorochloroethane, trifluorochloroethane, pentafluoroethane, trifluoroethane, difluorochloroethane, ethyl chloride, trifluoropropane, difluoropropane and octafluoropropane. Examples of decomposition-type blowing agents include gypsum, hydrated aluminas, azodicarbonamide, mixtures of sodium bicarbonate and citric acid, and sodium borohydrate. In general, a wide variety of blowing agents may be used in the present invention, the optimal blowing agent for a particular application of the invention will depend upon the type of resin being utilized and the type of article being formed (and the desired article's performance parameters, e.g., hardness, resiliency, compressiveness and specific gravity).

The molten, expandable resin composition may further contain nucleating agents, e.g., to regulate cell size within the foam. Suitable nucleating agents are known from the prior art. For example, talc, calcium carbonate, calcium sulfate, diatomaceous earth, magnesium carbonate, magnesium hydroxide, magnesium sulfate, clay and barium sulfate may be useful in particular applications. The nucleating agents are generally used in amounts of from 0.5 to 5 percent by weight, preferably from 0.5 to 2 percent by weight, based on the weight of the resin.

The molten, expandable resin composition may further contain conventional additives in the usual amounts, e.g., pigments, dyes, fillers, flameproofing agents, antistatic agents, stabilizers, lubricants, plasticizers and nucleating agents.

BRIEF DESCRIPTION OF THE DRAWINGS

The present invention will now be described in more detail with reference to the accompanying drawings, in which.

DETAILED DESCRIPTION OF THE PREFERRED EMBODIMENTS

Figure 1:
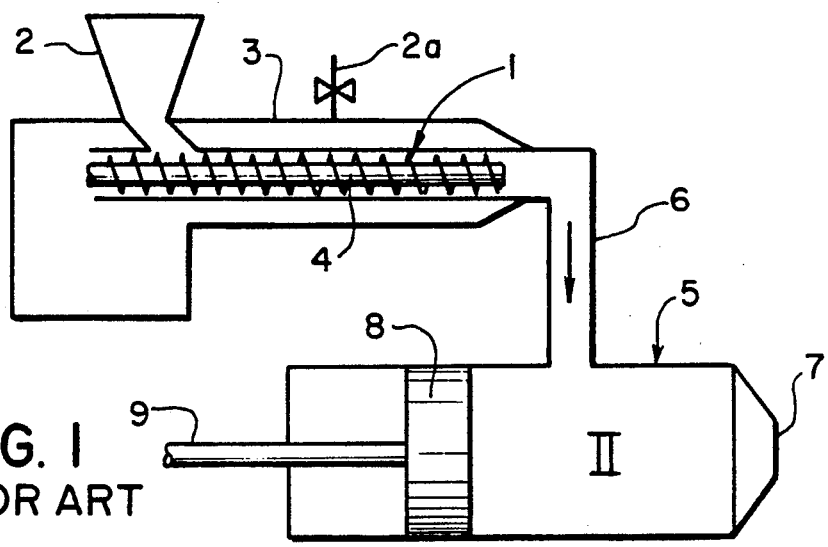
FIG. 1 is a schematic representation of an extruder/accumulator apparatus suitable for use with the method of the present invention.

The general process for preparing suitable foamable thermoplastic resin is outlined schematically in FIG. 1. The raw materials, such as thermoplastic resin pellets and, optionally, an expansion aid introduced from a hopper 2 are commingled with a blowing agent supplied through a line 2a in a mixing zone, designated generally as 1. The mixing is conducted at a temperature higher than the melting point of the thermoplastic resin and under a pressure to obtain a foamable melt. Customarily employed temperature and pressure conditions for mixing and melting thermoplastic resins (which are dependent upon the resin, blowing agent, additives, etc., used), are utilized in the present invention. The mixing is generally effected by means of an extruder 3 provided with a screw 4. Any extrusion system capable of producing foam may suitably be used.

The foamable melt of the expandable resin composition thus prepared in the mixing zone 1 is fed to an accumulator 5 through a passage 6 and accumulated therein. With some foam compositions, it may be advantageous to feed the foamable melt into a cooling zone before feeding the material into the accumulator 5. For some compositions, pre-accumulator cooling is helpful in achieving the optimum foaming temperature. A set of tandem extruders (one for mixing and a second to allow for pre-accumulator cooling) may also be used. Alternatively, in addition to mixing and melting zones, a portion of the extruder 3 may be configured to cool the mixture.

During the accumulation of the molten resin, the inside of the accumulator is maintained at a temperature and a pressure under which substantially no expansion of the molten resin is caused. Generally, the foamable melt is maintained at a temperature approximately the same as the melt exiting the extruder and lower than that in the mixing zone 1. For example, when a low density polyethylene is used, the accumulator is preferably maintained at a temperature of 88° to 116° C. (190° to 240° F.) and a pressure of 1034 to 6895 kPa (150 to 1000 psi). Particular temperature and pressure conditions will vary widely, however, depending upon the type of material being foamed and the type of article being produced. Heating and/or cooling units may be employed in the mixing and/or accumulator portions of the apparatus to assure that appropriate temperature conditions are maintained prior to foaming.

When a predetermined amount of the foamable melt has accumulated in the accumulator 5, it is rapidly discharged from the accumulator 5, through a die 7, into an atmosphere maintained at a pressure lower than that in the accumulator 5 (generally ambient pressure) so that the extruded foamable melt 10 commences expanding. To expedite the discharge of the foamable melt, it is preferable to use a means for forcibly discharging the molten resin. Thus, in the embodiment shown in FIG. 1, the accumulator 5 has a cylindrical shape and is provided with a gate (not shown) for opening and closing the aperture of the die 7 and with a ram 8 reciprocally slidably disposed therewithin. The ram 8 is secured to a piston rod 9 of a hydraulic means (not shown). Rapid discharge of the accumulated foamable melt is preferred to assure that all portions of the extruded material are equally foamed and cooled (e.g., in an athletic shoe midsole, to assure that both the heel and the toe portions of the discharged material are equally foamed and cooled) and to preclude premature formation of a skin on the discharged material. Preferably, the accumulator 5 is capable of intermittently discharging material at a rate of about 500 Kg/hr or more.

The ram 8 is preferably operated in the following manner. The molten resin prepared in the mixing zone 1 is continuously introduced under pressure into the accumulator 5 through the passage 6 while the aperture of the die 7 is closed by the gate. The pressure is transmitted to the ram 8 so that the ram 8 is gradually slid as the molten resin is accumulated within the accumulator 5. When the foamable melt accumulated in the accumulator 5 reaches a predetermined volume, the hydraulic means is actuated and, simultaneously, the gate is opened. Thus, the piston rod 9 is driven to advance the ram 8 toward the die 7, thereby ejecting the accumulated foamable melt through the die 7 into the atmosphere. Thereafter, the gate is closed and the pressure of the hydraulic means is released so as to decrease the pressing force of the ram 8 to a predetermined level.

The pressure inside the accumulator 5 is controlled so as to remain within a range such that the foaming of the molten resin is prevented. This can be performed by controlling the pressure exerted by the hydraulic means and applied to the ram 8.

Alternatively, the molten material may be ejected into the atmosphere directly from the extruder 3 (if sufficient discharge rates are attained whereby foaming of the material within the die is prevented and differential cooling of the extruded material is prevented—e.g., to prevent differential cooling in the heel and toe regions of a shoe midsole). In a second alternate embodiment, the material (after leaving the extruder 3) may be first passed through a second, cooling, extruder before being passed into the accumulator 5.

Figure 2:
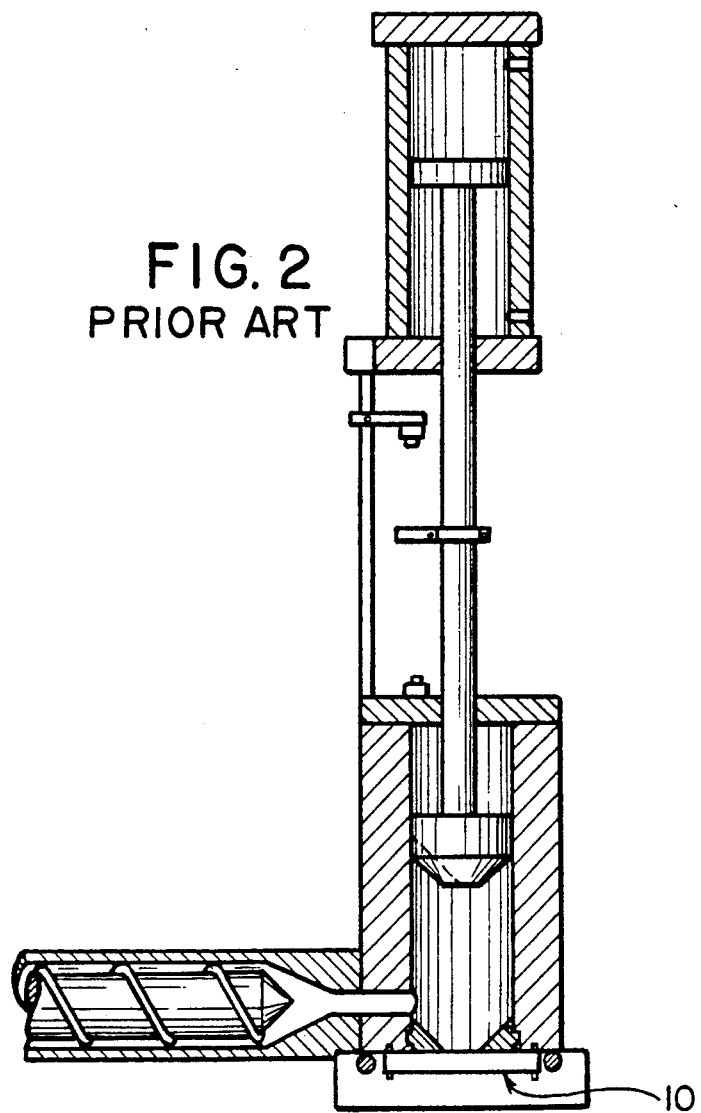
FIG. 2 is a side plan view of an alternate extruder/accumulator arrangement having a vertical gate.

A preferred example of the accumulator as described above is disclosed in U.S. Pat. No. 4,323,528, the disclosure of which is hereby incorporated by reference. FIG. 2 shows an alternate extruder/accumulator arrangement having a horizontal gate 70, whereby the material leaving the accumulator 5 moves vertically.

Figure 5:
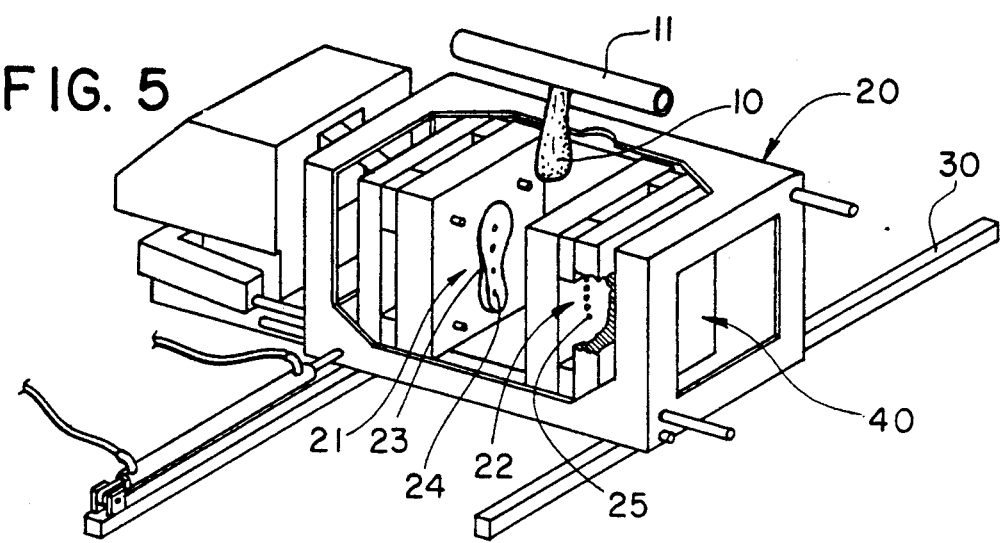
FIG. 5 is an elevated perspective view, partially in section to show the vents disposed in the female mold section, of a mold apparatus of the present invention showing a quantity of molten, expandable thermoplastic material being ejected (e.g., from an extruder and/or accumulator) and beginning to hang down between the male and female mold sections.
Figure 7:
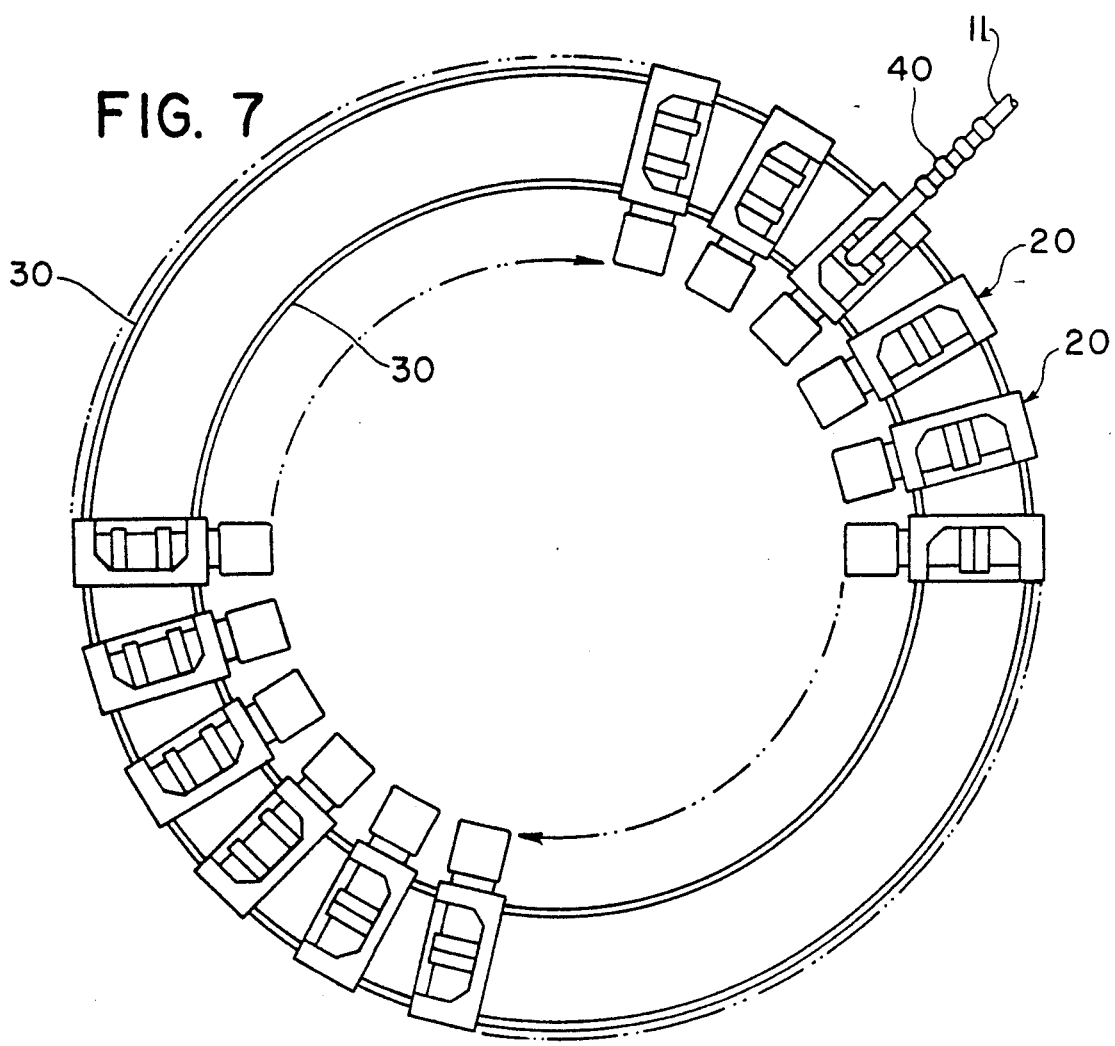
FIG. 7 is a schematic representation of an alternate configuration of the present invention wherein multiple molds are arranged on a circular carousel.

Upon being extruded from the accumulator 5, the thermoplastic material 10 begins to foam. As shown in FIG. 5, the material is preferably allowed to hang down vertically from the die 7 in an unsupported fashion. In FIG. 5, the material 10 is shown being ejected from a pipe 11 (e.g., connected to an accumulator 5), but in appropriate situations, the thermoplastic material 10 could be extruded directly from the extruder 3. Furthermore, the pipe 11 may be horizontally disposed (as shown in FIGS. 5 and 7) or vertically disposed (e.g., or the material may be extruded vertically-downwardly from the accumulator 5 directly, e.g., FIG. 2). Since the thermoplastic material 10 is preferably being extruded between the mold halves of a vertically-oriented mold apparatus, however, the discharge pipe 11 is preferably vertically-oriented to limit the tendency of the ejected thermoplastic material 10 to curl (i.e., reflecting a flow direction memory of the non-vertical components of the movement of the material 10 within the pipe 11).

Most thermoplastic materials 10 become almost fully foamed essentially immediately after being extruded from the accumulator 5. Therefore, no purposeful period of free-fall (i.e., between the pipe 11 and the mold 20) is normally necessary. Rather, in order to limit the amount of excess material being extruded (i.e., in excess of the amount of material required to fill the mold) the ejected material 10 is preferably captured by the male 21 and female 22 mold sections as soon as feasible after being extruded. Quickly capturing the ejected material within the mold 20 helps to preclude the formation of a foam cell-covering "skin" on the extruded material (since the skin may preclude the material from filling intricate shapes in the mold sections) and helps to maintain a homogenous level of expansion and solidification within the extruded material 10 before molding (e.g., from toe to heel of a shoe midsole). From a practical viewpoint, however, it may be best to allow some free-fall of the extruded material 10 before molding (i.e., distance between the pipe 11 and mold 20) to help limit the fouling of the outside of the mold 20 by excess thermoplastic material (since uncrosslinked thermosetting material is preferably used with the inventive process, however, any excess material, e.g., on the outside of the mold, can at least be reprocessed and reused). In some situations, however, (e.g., with certain types of resins, or when making some types of articles) it may be best to allow the ejected material a longer period of free-fall before molding is commenced.

The shape of the extruded material 10 may be largely controlled by utilization of an appropriately shaped die 7. For example, a rectangular die may be used to produce extruded material having a generally rectangular cross-section and a round die may be used to produce a generally cylindrically-shaped mass of extruded material. More preferably, the die shape and extrusion rate may be coordinated to produce an extruded mass of material 10 having the desired configuration. For example, if a round die is employed and the accumulator 5 is programmed to extrude the material 10 in a (comparatively-speaking) slow-fast-slow sequence, due to the fact that most thermoplastic materials foam more vigorously when extruded at higher rates, the material will form a narrow-wide-narrow cylindrical mass of material suitable for molding into a football. Different die configurations and extrusion rates may be used to produce extruded masses of material of widely-varying shapes.

Once the requisite amount of foamable melt material has been ejected from the pipe 11 (or alternatively, from the accumulator 5 or extruder 3 directly), e.g., about 100-150 grams for an average size shoe midsole—which is preferably accomplished in about two seconds or less of ejection time (the weight of the ejected material and preferred ejection time depending upon the density of the foamable melt material being used), the mold sections are closed around the ejected material 10 (often called a "parison" in the industry). As the male 21 and female 22 mold sections are moved together (e.g., hydraulically or by any other suitable method) they enclose therebetween a mold cavity 23 (e.g., having the form of the desired shoe midsole). As the mold sections close, they capture a portion of the parison of thermoplastic material 10 within the mold cavity 23. Alternatively, more than two mold sections may be used to constitute the mold cavity 23.

As discussed above, with many thermoplastic materials, the material is nearly fully foamed upon ejection, but any minor amount of remaining foaming/expansion when the material is captured within the mold cavity 23 may actually be helpful in conforming the shape of the thermoplastic material into the shape of the mold cavity 23, and especially, in filling in any depressions or void areas within the female mold section 22, e.g., representing company logos on the sides of the shoe midsoles. In part because of the short amount of time between ejection and capture of the parison of thermoplastic material, the material within the mold cavity is still easily formable when it is captured and may be somewhat compressed by the action of the mold sections to further facilitate the formation of intricately-shaped molded articles.

In an alternate embodiment (see FIG. 5), the male mold section 21 is provided with a plurality of jets 24 for emitting gases (e.g., air) under pressure. The gas emitted from these jets 24 further helps to insure that the ejected thermoplastic material 10 fully fills any voids or depressed areas within the female mold section 22 by forcing the material into the female mold section 22. In order to allow the action of the jets 24 to effectively act upon (i.e., move) the material 10 within the mold cavity 23, the mold cavity should include an airtight seal (e.g., provided by rubber gaskets disposed between the mold sections). The jets 24 may also be helpful in limiting the formation of excess material (or "flash") around the molded article (which must be trimmed from the molded article after the process is complete).

Figure 6:
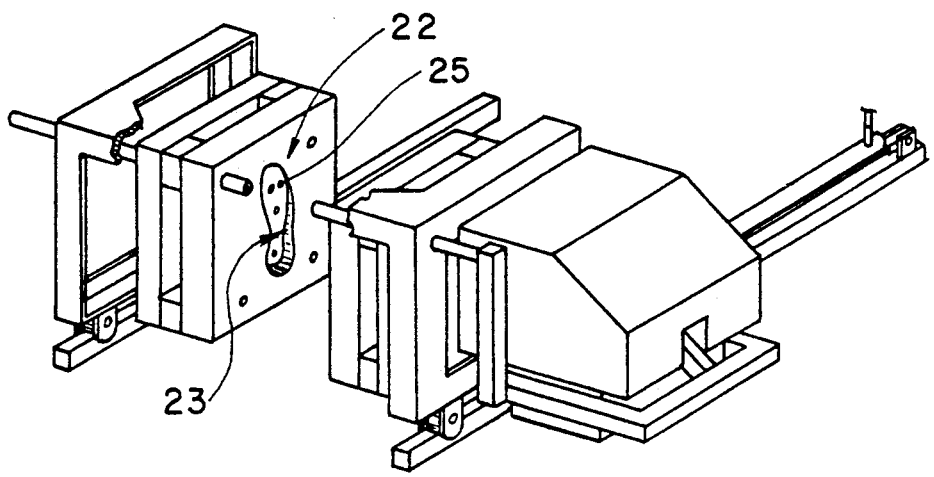
FIG. 6 is an elevated perspective view of a mold apparatus of the present invention showing the mold section open and showing a female mold section having vents disposed therein.

In a second alternate embodiment (see, FIG. 5, and especially, FIG. 6), one or both of the mold sections 21, 22 (preferably the female mold section 22) is provided with a plurality of vents 25, whereby gases may escape/be drawn out of the mold cavity 23 as the parison is compressed by the two mold sections. Hence, in this embodiment, vents 25 also help to insure that the ejected thermoplastic material 10 fully fills any voids or depressed areas within the mold sections 21, 22. As noted above, although the vents 25 are preferably disposed within the female mold section 22, vents 25 may be disposed in either or both mold sections 21, 22. Vents 25 should not be disposed in a mold section which also has jets 24, however.

The foamed thermoplastic material 10 is preferably maintained within the mold cavity 23 until the thermoplastic material has solidified into the form of the desired article. If the pressure on the thermoplastic material is maintained for too little time, (i.e., the mold sections are separated too soon) post-release expansion of the material may occur (e.g., causing cells within the foam to pop, and thereafter, causing voids to form in the molded article). If pressure is maintained on the thermoplastic material 10 for too long, however, the foam within some areas of the molded article may collapse (causing sink marks). The preferred amount of molding time will vary according to the material being utilized, the mass of material being molded and the type of article being formed. For example, in forming an athletic shoe midsole from HYTREL ®, the foamed material is preferably maintained within the mold for about 2 to 3 minutes.

Figure 8:
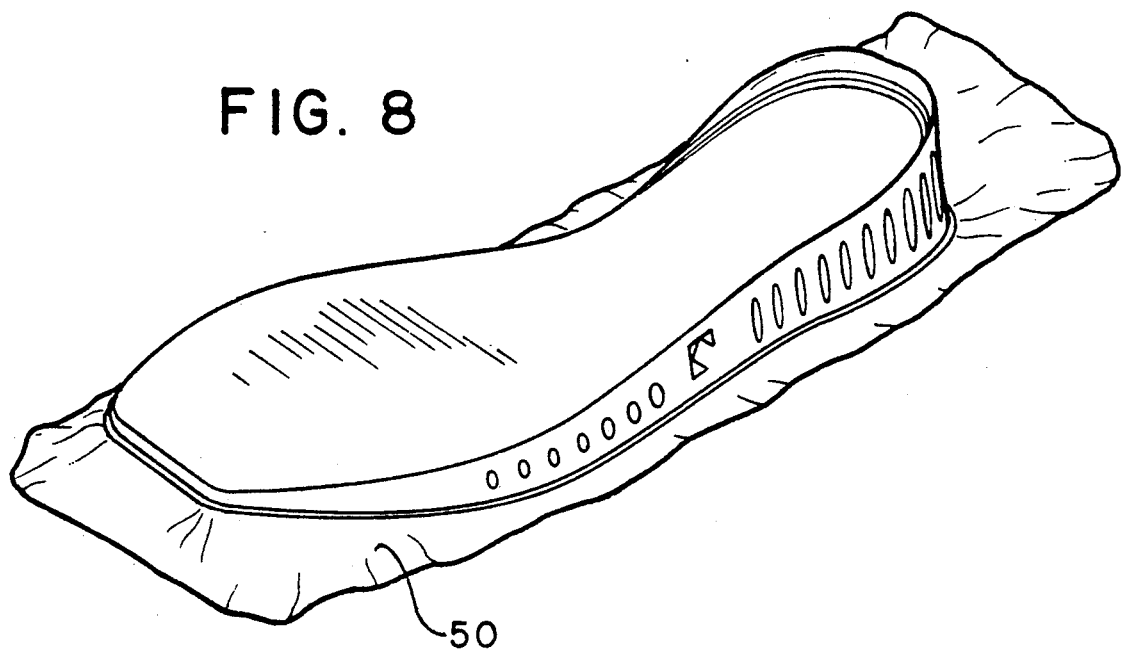
FIG. 8 is an elevated perspective view of a molded foam midsole produced by an apparatus of the invention.
Figure 9:
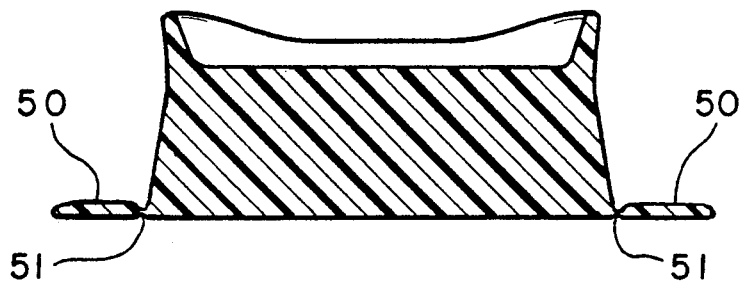
FIG. 9 is a side view, in cross-section, of a molded foam midsole produced by an apparatus of the invention wherein the flash may be removed by hand.
Figure 10:
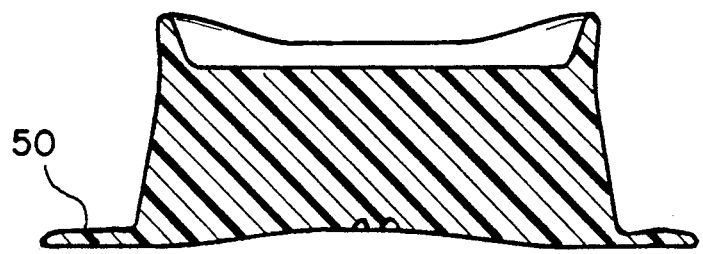
FIG. 10 is a side view, in cross-section, of a molded foam midsole produced by an apparatus of the invention wherein the flash is limited to the bottom of the midsole.

After the thermoplastic foam has been maintained within the mold cavity 23 for an appropriate length of time, the two mold sections 21, 22 are separated and the molded foam material (e.g., shoe midsole) is removed. Since the parisons of material ejected from the pipe 11 (or accumulator 5, or extruder 3) will always be of slightly different sizes, there will always be some excess material which must be trimmed from the finished molded article (e.g., with a shoe midsole of desired finished weight of 105-110 grams, the molded material present when the mold is opened commonly has a total weight of 135-139 grams). This excess material, e.g., around the edges of the molded article, is known in the industry as "flash" (e.g., in FIG. 8, flash 50). The flash may be easily trimmed from around the edges of the midsole without destroying the outer surface, or "skin" of the molded article. Preferably, the mold sections 21, 22 are configured to minimize the amount of flash generated during processing, however, to limit the amount of wasted material. The mold sections 21, 22 are preferably configured to meet at, for example, the bottom portion of the molded article (e.g., shoe midsole), whereby the flash may be trimmed from only one side (i.e., the bottom) of the molded article (see, FIGS. 9 and 10). In this way, for example, if jets 24 are used, any imperfections created in the surface of the molded article by the jets 24 may be eliminated when the flash is trimmed. More preferably, the mold sections 21, 22 are configured to produce a flat bottom surface on the molded article whereby the flash may be trimmed off with a single horizontal cut (see, FIG. 10—both flash 50 and bottom imperfections, e.g., caused by jets 24, may be eliminated in one cut). Most preferably, the mold sections 21, 22 are configured to form a sharp line of intersection (or "part" line) therebetween (e.g., through use of a male mold section having only a short ridge around the outline of the midsole—see, FIG. 5, thereby forming a wedge 51 between the midsole and the flash 50, facilitating separation of the midsole and flash) whereby, after the molded article is released from the mold cavity 23, the flash will be attached to the molded article by only a thin bridge of material which may be easily severed by hand by ripping the flash from the molded article (see, FIG. 9). Furthermore, since the process of the present invention preferably utilizes uncrosslinked thermoplastic material, any flash produced may be reprocessed/remelted and incorporated into future molded products.

Figure 3:
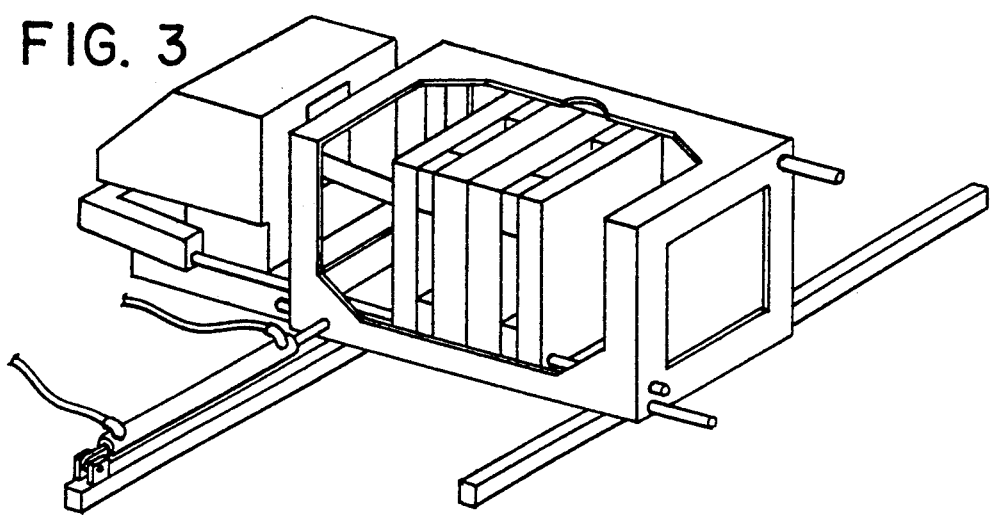
FIG. 3 is an elevated perspective view of a mold apparatus of the present invention showing the male and female mold sections closed.
Figure 4:
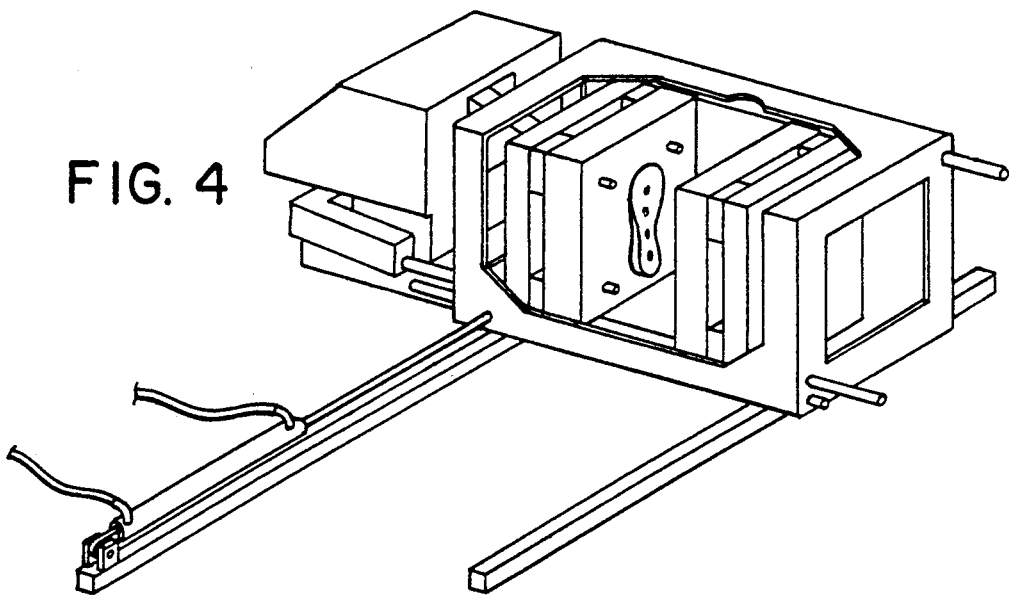
FIG. 4 is an elevated perspective view of a mold apparatus of the present invention showing the male and female mold sections open.

Given the length of time the mold 20 must remain closed as the parison of ejected foamed thermoplastic material 10 solidifies therein (i.e., to the point where, respectively, both post-release expansion and collapse of foam cells are avoided—e.g., for a shoe midsole formed from HYTREL®, about 2-3 minutes), the inventive apparatus is more preferably configured to allow for more continuous utilization of the extruder/accumulator, i.e., a plurality of parisons of thermoplastic material being ejected during any one molding cycle. A variety of apparatus configurations may prove beneficial in this regard. For example, FIGS. 3-5 show the mold 20 mounted on rails 30, whereby after one parison of thermoplastic material has been ejected into one mold 20, the mold may be slid out from under the extruder/accumulator pipe 11 and another (perhaps differently-sized) mold 20 may be positioned beneath the pipe 11 to receive a second parison 10 of thermoplastic material. The accumulator 5 may also be adjusted or preprogrammed to vary the quantity of material ejected per parison and/or the speed at which the material is ejected. In another preferred embodiment, a plurality of molds 20 may be mounted on a circular carousel (see, FIG. 7). For example, if a particular molded article has a mass such that the available accumulator can produce ten parisons of material of the requisite size to produce the article per minute and the articles require one minute of cooling time within the mold cavity to solidify, a carousel having ten molds may profitably be employed. Also, to insure consistent mold temperatures during the preferred continuous molding process, the mold 20 also has associated therewith a temperature control mechanism 40 for heating or cooling the mold 20 as required.

The inventive apparatus and process may be further understood through reference to the following non-limiting examples.

EXAMPLES

FOAMED ATHLETIC SHOE MIDSOLES

Materials

A preferred thermoplastic multi-block copolymer elastomer used in some of the examples was a copolyetherester elastomer sold by DuPont under the trademark HYTREL®, grade 4078W. Depending upon the desired properties, however, a variety of other elastomers may also be used with the apparatus and process of the present invention. For example, ethylene vinylacetate (EVA), SANTOPRENE® (a thermoplastic elastomer made by Monsanto, Co.), KRATON® (a styrene-butadiene elastomer made by Shell Chemical Co.), PELLETHANE (a thermoplastic polyurethane made by the Dow Chemical Co.), and a variety of other materials such as copolyetheramide ester may also be used in appropriate circumstances. As discussed above, however, regardless of the particular material being foamed, it is important that the requisite levels of hardness, resiliency, compressive strength and specific gravity be attained. For example, in the production of athletic shoe midsoles, the foamed material should exhibit at hardness of 30 to 70 ASKER C (preferably about 40 to 55 ASKER C), an energy return ratio (i.e., resiliency) of at least 0.20 (under ASTM method D-2632-79), a compressive strength of 48 to 138 kPa (7 to 20 psi) at 10% compression, 117 to 207 kPa (17 to 30 psi) at 25% compression, and 248 to 379 kPa (36 to 55 psi) at 50% compression. Finally, to be suitable as a midsole, a elastomer should be foamable to a specific gravity of about 0.5 gm/cm$^3$ or less.

Both decomposition-type blowing agents and solvent-type blowing agents may be used in the present examples. Traditional nucleating agents and other foaming materials are also employed as hereinafter described in further detail.

Foam Preparation

The foams described in the following examples were prepared in a 7.62 cm (3 inch) diameter, 48:1 (length:diameter) extruder. The extruder was equipped with an apparatus for injecting therein foaming agents and the forward portion of the extruder barrel was jacketed for cooling using circulating water. The extruder was attached to a foam accumulator, e.g., as described in U.S. Pat. No. 4,323,528. The accumulator was equipped with a piston for ejecting (extruding) the foamable melt through a closable die. The speed of the piston was variable to provide various extrusion rates. The use of an accumulator is not necessary to produce foams of large cross-sections with a large extruder. However, its use was required with the relatively small foam extruder used in the examples, which, by itself, would be incapable of producing foams of large cross-section. The use of a relatively small extruder also conserved raw materials as the foamable melt was intermittently extruded at rates of about 454 to 2268 kg/hr (1000 to 5000 lbs/hr) (preferably about 1134 kg/hr (2500 lbs/hour)) while the actual output rate of the extruder was about 54.4 kg/hr (120 lbs/hr). Within the accumulator, the foamable material is preferably maintained at about 3448 kPa (500 psi).

EXAMPLE 1

The foam accumulator was equipped with a radially-configured die having an aperture with cord length of 3.42 cm (1.345 inches), an arc length of 3.81 cm (1.50 inches) and a gap of 0.279 cm (0.110 inches) [the dimensions of the particular die orifice utilized will depend upon the article being manufactured, the type of material being foamed, the ejection rate of the material, etc.]. Because the thermoplastic resins utilized in the present invention are commonly hygroscopic, the resin (e.g., in the form of pellets) was desiccated before being fed into the extruder. This desiccation of the resin may be accomplished in the hopper or before the resin is introduced into the extruder. Normally, contacting the resin with air which has been exposed to a desiccant (e.g., silica gel) and heated for about 2 hours at 93° C. (200° F.) adequately desiccates the resin [with HYTREL®, however, it is preferable to desiccate the resin with air which has been heated to 107° C. (225° F.)]. The thermoplastic multiblock copolymer elastomer HYTREL® 4078W was mixed into the hopper of a singlescrew extruder. The elastomer was mixed with about 0.33% (by weight of total mix) of HYDROCEROL TM CF-40 (for cell size control—"Hydrocerol" is an encapsulated mixture of sodium bicarbonate, citric acid and citric acid salts which liberates carbon dioxide and water under elevated temperatures in the extruder) and about 2½% (by weight) white color masterbatch. The foaming agent, isobutane, was injected into the extruder at a rate of about 0.32 kg per hour (0.7 lbs/hr). The output of the extruder was about 54.4 kg per hour (120 lbs/hr). After the foaming agent was injected, it was mixed into the polymer and then the mixture was cooled to the proper foaming temperature, about 174° C. (about 345° F.). The foamable melt exiting the extruder was transferred under pressure to the accumulator where it was stored and released intermittently at a rate of 1134 kg per hour (2500 lbs/hour).

Upon opening of the accumulator gate, a parison of material was extruded. The amount of material extruded will depend upon the type of article being formed and how well tuned the apparatus is. In the case of a shoe midsole, it is expected that approximately 135 to 139 grams of material will be trapped between the mold halves of the apparatus (i.e., forming the molded article and the flash). Upon extrusion, the foamable melt commenced foaming and hung downward from the die orifice. The extruded material was captured between the male and female mold sections of a vertically-oriented mold. The male and female sections of the mold enclosed the extruded material within a mold cavity in the shape of a shoe midsole. The extruded material was maintained in the mold cavity for 2¾ minutes (165 seconds) until the shoe midsole was formed. After the flash was trimmed, the midsole weighed about 105 to 110 grams.

EXAMPLE 2

The same materials used in Example 1 were used in this example. The apparatus used to mold the ejected, foamed thermoplastic resin included, in the male mold section, a plurality of jets. The jets were used to emit pressurized air (e.g., at about 138 kPa (20 psi)) against the material captured within the mold cavity, thereby urging the material to fill even intricately-shaped recesses (e.g., brand logos) within the female mold section. The mold sections were gasketed with rubber to prevent gas from escaping from between the mold sections. The mold sections were configured to join near the bottom of the midsole, whereby the flash could be removed in a single, horizontal cut. Insofar as this horizontal cut shears cells within the molded foam material, it may even be beneficial in the production of athletic shoe midsoles since this horizontal surface is subsequently bonded to other materials (e.g., the shoe outsole) and the open cells may assist subsequent glue bonding.

EXAMPLE 3

The same materials used in Example 1 were used in this example. The apparatus use to mold the ejected, foamed thermoplastic resin included, in the female mold section, a plurality of apertures for venting or drawing-off gases from the material captured within the mold cavity, thereby urging the material to fill even intricately-shaped recesses within the female mold section.

The vents are preferably matched to a particular type of mold, whereby all excess gases may be removed from the mold cavity. For example, in the case of forming an athletic shoe midsole, if the mold sections are configured to join together (or form a "part line") at the bottom of the midsole, vents may preferably be positioned on the top of the midsole and in any fins disposed in the midsole (e.g., on the sides of the midsole). Venting is especially helpful in indented areas of the female mold section, because air may otherwise easily become trapped in these areas and prevent the foamed material from filling the recessed areas, thereby causing gaps in the fins of the finished articles. On the other hand, for example, if the part line between the two mold sections is configured to be formed at the top of the midsole, it may be unnecessary to provide vents in all of the fins (i.e., since some of the air which would otherwise be trapped in the vents may escape the mold cavity through the part line).

The positioning of the part line and the utilization of vents are preferably balanced to achieve the overall goal of minimizing the amount of gas which is trapped inside the mold cavity when the thermoplastic material is molded. In general, positioning the part line at the bottom of the midsole makes it easier to trim the flash from the midsole, whereas positioning the part line near the top of the midsole decreases the number of vents which must be used to evacuate the gas from the mold cavity (since the part line may vent much of the gas trapped in the midsoles indented fins).

EXAMPLE 4

The same materials used in Example 1 were used in this example. In order to facilitate removal of the flash, the mold sections were configured to form only a very sharp part line just above the top of the shoe midsole, whereby the flash was only very tenuously attached to the molded midsole. The sharpness of the part line permitted the flash to be peeled away from the molded article by hand.

EXAMPLE 5

The same equipment used in Example 1 was used in this example. The elastomer utilized was PELLETHANE®, Series 2102-90a, a polyester polycaprolactone manufactured by The Dow Chemical Company of Midland, Mich. After the resin was desiccated by being contacted for two hours with air which had been heated to 93° C. (200° F.) and passed through a dessicant, the PELLETHANE® Series 2102-90a was mixed with the blowing agent (isobutane—which constituted about 11 percent by weight of the mix) and the nucleating agent (talc—which constituted about 0.5 percent by weight of the mixture or less). The output of the extruder was about 50.8 kg per hour (112 lbs/hour) of material. After the blowing agent was injected, it was mixed into the polymer and then the mixture was cooled to the proper foaming temperature, about 204° C. to 207° C. (400° F. to 405° F.). The foamable melt exiting the extruder was transferred under pressure to the accumulator where it was stored at a pressure of about 1551 to 1724 kPa (225 to 250 psi) and released intermittently at a rate of about 19,996 kPa (2900 lbs/hour).

A portion of the extruded thermoplastic material weighing approximately 115 to 120 grams was captured between the male and female mold sections of a vertically-oriented mold. The mold sections enclosed the ejected material within a mold cavity in the shape of a shoe midsole. The ejected material was maintained in the mold cavity (the mold cavity of this example was the same size as that utilized in Example 1) for about 2¾ minutes (165 seconds) until the midsole had solidified. After being released from the mold and having the flash trimmed, the midsole weighed about 85 to 90 grams.

Like the midsole produced in Example 1 (and like the midsoles produced by all of the other examples as well) the article of molded thermoplastic material produced by the inventive process in this example was capable of performing as an athletic shoe midsole (i.e., had sufficient hardness, resiliency, compressive strength and specific gravity). Relative to the midsole produced in Example 1, the midsole produced in this example had a lower density, a lower resiliency and a higher rigidity per mass of material. Hence, depending upon the desired properties of the finished article sought in a particular application, the apparatus and process of the present invention may profitably be utilized with a wide variety of materials.

I claim:

1. A foamed, molded article prepared from an unfoamed resin, wherein said foamed article has a density reduction of at least about 0.5 relative to the density of said unfoamed resin and having:
   (a) a hardness of 30 to 70 ASKER C;
   (b) an energy return ratio of at least 0.20 under the test procedure of ASTM bulletin no. D-2632-79;
   (c) a compressive strength of 48 to 138 kPa at 10% compression, 117 to 207 kPa at 25% compression, and 248 to 379 kPa at 50% compression.
2. The foamed, molded article of claim 1 wherein said article has a substantially uniform cellular structure and density throughout said article.
3. The foamed, molded article of claim 2 wherein said thermoplastic resin is a polyolefin resin.
4. The foamed, molded article of claim 3 wherein said thermoplastic resin in uncrosslinked.
5. The foamed, molded article of claim 2 wherein said thermoplastic resin is a foamable copolyetherester elastomer.
6. The foamed, molded article of claim 4 wherein said foamed molded article is a shoe midsole and wherein detailed indentations are formed in said shoe midsole without secondary compression molding.
7. The foamed, molded article of claim 1 wherein said article has a specific gravity of about 0.5 gm/cm$^3$ or less.
8. A foamed, molded article of claim 1 said article formed by the steps comprising:
   (a) preparing a foamable melt from a molten mass of a foamable thermoplastic resin at a temperature and a pressure at which said foamable melt is prevented from foaming;
   (b) extruding a quantity of said foamable melt through an orifice, into an atmosphere maintained at a lower pressure to expand it into a foam, said thermoplastic resin becoming almost fully foamed essentially immediately after said extruding;
   (c) capturing at least a portion of the extruded resin within a mold cavity while said foamable melt is expanding into a foam and while it is depending from said orifice, said mold cavity having at least two substantially vertically-oriented mold sections with complimentary-shaped configurations, said mold sections being movable relative to each other; and
   (d) then compressing and maintaining said foam within said mold cavity to cause said foam to fill depressions within said mold cavity and to cause said foam to solidify into a foamed molded article of the desired form.
9. The foamed, molded article of claim 8 wherein said article is a shoe midsole.

* * * * *